(12) United States Patent
Hammes

(10) Patent No.: US 9,980,421 B1
(45) Date of Patent: May 29, 2018

(54) NON-CLOGGING COULTER ASSEMBLY

(71) Applicant: AgSynergy, L.L.C., Seneca, KS (US)

(72) Inventor: Ryan J. Hammes, Seneca, KS (US)

(73) Assignee: AgSynergy, L.L.C., Seneca, KS (US)

( * ) Notice: Subject to any disclaimer, the term of this patent is extended or adjusted under 35 U.S.C. 154(b) by 98 days.

(21) Appl. No.: 14/960,959

(22) Filed: Dec. 7, 2015

(51) Int. Cl.
*A01B 15/18* (2006.01)
*A01B 49/06* (2006.01)
*A01B 61/04* (2006.01)
*A01B 63/00* (2006.01)
*A01B 49/02* (2006.01)

(52) U.S. Cl.
CPC ............. *A01B 49/06* (2013.01); *A01B 15/18* (2013.01); *A01B 49/027* (2013.01); *A01B 61/046* (2013.01); *A01B 63/008* (2013.01)

(58) Field of Classification Search
CPC ....... A01B 15/18; A01B 15/00; A01B 49/027; A01B 49/02; A01B 49/00; A01B 61/046; A01B 61/044; A01B 61/04; A01B 61/00; A01B 63/008; A01B 63/002; A01B 63/00; A01B 49/06; A01B 49/04
See application file for complete search history.

(56) References Cited

U.S. PATENT DOCUMENTS

| 197,204 | A | 11/1877 | Concannon et al. |
|---|---|---|---|
| 709,741 | A | 9/1902 | Burrill |
| 1,062,069 | A | 5/1913 | Wicksteed |
| 2,391,910 | A | 1/1946 | Lutes |
| 2,912,944 | A | 11/1959 | Snow et al. |
| 4,273,057 | A * | 6/1981 | Pollard ................. A01C 5/06 111/136 |
| 4,656,957 | A | 4/1987 | Williamson et al. |
| 4,716,971 | A | 1/1988 | Lanham |
| 4,723,495 | A * | 2/1988 | Dietrich, Sr. .......... A01C 5/068 111/123 |
| 5,626,196 | A | 5/1997 | Hughes |
| 7,481,171 | B2 | 1/2009 | Martin |
| 8,453,755 | B2 | 6/2013 | Renyer et al. |
| 8,813,865 | B2 | 8/2014 | Renyer et al. |
| 2010/0282480 | A1 | 11/2010 | Breker et al. |
| 2012/0048160 | A1* | 3/2012 | Adams ................... A01C 7/203 111/163 |
| 2014/0238283 | A1* | 8/2014 | Wendte ................. A01C 5/064 111/164 |
| 2016/0165789 | A1* | 6/2016 | Gervais ................. A01C 7/105 700/275 |

OTHER PUBLICATIONS

Agronomics Row Crops Cultivator Components, available online at http://www.sare.org/publications/steel/pg26.htm. Date Accessed: Dec. 29, 2010.

* cited by examiner

*Primary Examiner* — Christopher J. Novosad
(74) *Attorney, Agent, or Firm* — Hovey Williams LLP

(57) ABSTRACT

A coulter assembly (10) includes a rotatable coulter blade (12) and a supporting assembly (14) having a parallel linkage arm assembly (34) and an active piston and cylinder assembly (58). The assembly (14) serves to maintain the blade (12) at a depth of at least about four inches, in order to prevent clogging of the assembly (10) during use.

10 Claims, 3 Drawing Sheets

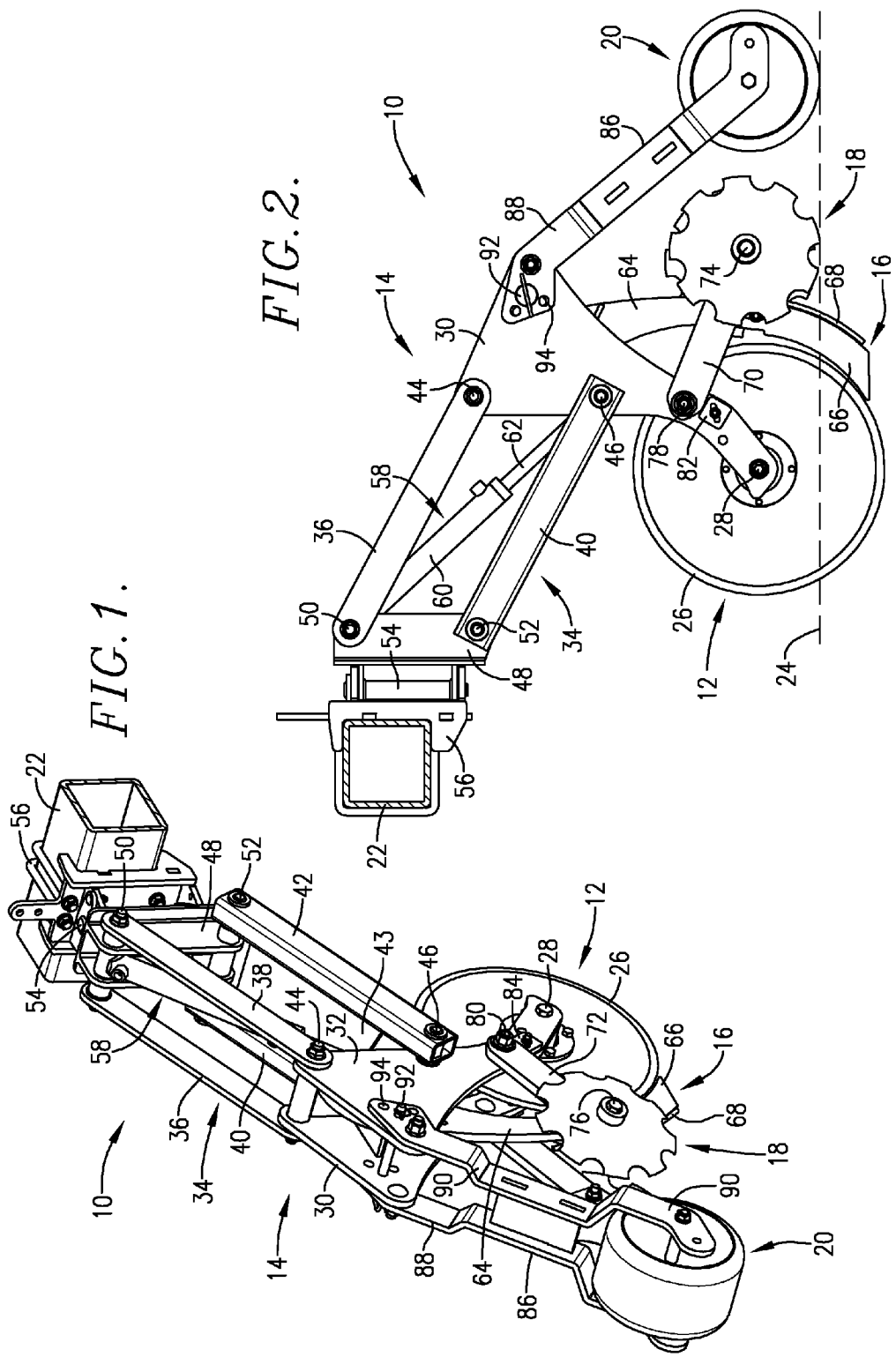

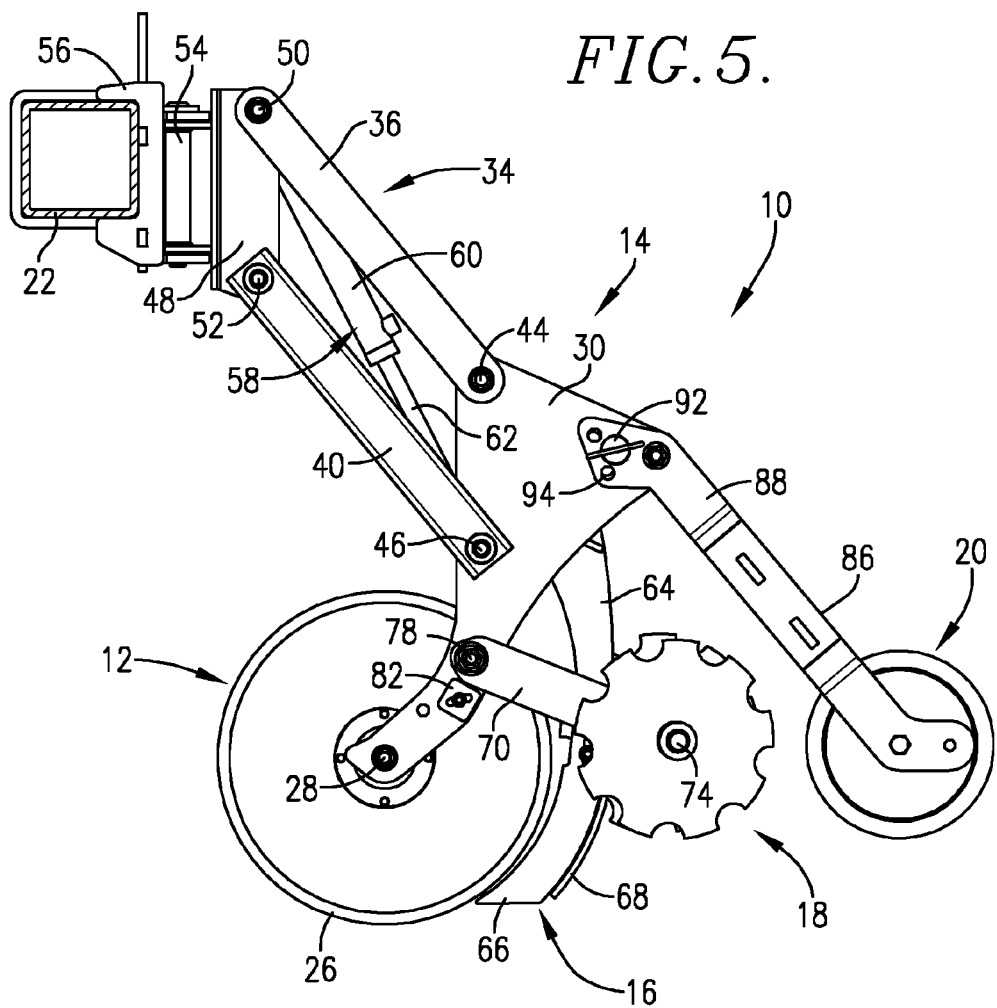

NON-CLOGGING COULTER ASSEMBLY

BACKGROUND OF THE INVENTION

Field of the Invention

The present invention is broadly concerned with improved tillage or fertilizer application implements used in agricultural applications. More particularly, the invention is concerned with coulter assemblies which are designed to minimize or eliminate clogging of the assemblies as they traverse the earth.

Description of the Prior Art

A variety of farm implements have been provided in the past for seed planting or incorporation of various liquid preparations and/or other products into the soil. Generally, these implements include a plurality of rotatably mounted, disk-shaped coulter blades, which form slits or trenches in the soil as the implement is pulled through a field. In fertilizer or seeding applications, each coulter blade is typically trailed by a shoe or knife supporting a tube through which liquid fertilizer, seeds, or the like is incorporated into the soil. An implement of this character is described in U.S. Pat. No. 4,656,957. Other background references include U.S. Pat. Nos. 197,204, 709,741, 1,062,169, 2,391,910, 2,912,944, 5,626,196, 7,481,171, 8,813,865, 8,453,755, US Patent Application Publication No. 2010/0282,480 and non-patent literature article entitled "Agronomic Row Crops-Cultivator Components," found on-line at http://www.sare.org/publications/steel/pg26.htm, (Date Accessed Dec. 29, 2010). See also, the following websites:
 http://www.yetterco.com/products?catId=133&productId=11;
 http://www.yetterco.com/products?catId=133 &productId=173; and
 http://www.kongskilde.com/us/en-US/Agriculture/Soil/Fertilising%20technique/Acce
ssories%20for%20toolbars%20and%20Applicators/Row%20Pro%20300%20-%20Par allel%20Linkage%20-%20Standard%20Row%20Unit A consistent problem with many prior coulter assemblies is the tendency of the units to clog, particularly in the constricted area between the blade and the trailing knife or shoe. In some instances, the clogging problem can be so serious as to substantially impede tillage or fertilizer operations, by requiring the operator to frequently stop and clear the clogs. A careful study of prior coulter assemblies has revealed that a principal problem is the occurrence of "hair-pinning" during operation of the units. "Hairpinning" refers to the phenomenon where elongated pieces of straw or other field trash wrap around the coulter blades as they rotate, without being fully cut by the blade, and thus assume a U shape similar to that of hair pin. These hair pin pieces then lodge between the periphery of the coulter blade and the adjacent knife or shoe, which quickly generates clogs.

There is accordingly a need in the art for improved coulter assemblies which are substantially non-clogging during operation, and which particularly overcome the "hairpinning" problem.

SUMMARY OF THE INVENTION

The improved coulter blade assemblies of the invention provide a number of features which in combination largely if not entirely overcome the clogging problems that have plagued prior coulter units. In general, the coulter blade assemblies include support structure having a parallel linkage arm assembly together with an active hydraulic piston and cylinder assembly serving to maintain down-pressure on the coulter blade to maintain blade depth. This in turn ensures that the blade will fully cut straw and other field debris to prevent clogging.

Thus, coulter blade assemblies in accordance with the invention comprise a coulter blade and structure supporting the coulter blade for earth tillage or fertilizer application; the supporting structure includes a parallel linkage arm assembly comprising upper and lower pivotal linkage arms, and an elongated, obliquely oriented piston and cylinder assembly secured to the supporting structure and operable to maintain the coulter blade at a substantially constant depth as the coulter assembly traverses the earth. The overall assemblies also have a knife located adjacent and rearwardly of the coulter blade, along with a covering disk located rearwardly of the coulter blade and knife in order to lose the slit or trench formed by the coulter blade. Finally, an earth-engaging follower gauge wheel is located rearwardly of the covering disk, in order to further assure closure of the slit or trench, and to assist in maintaining proper coulter blade depth during operation.

In preferred forms, the coulter blade is essentially vertically oriented and presents opposed, substantially flat faces. This is to be contrasted with prior units having obliquely oriented coulter blades. Additionally, the longitudinal axis of the piston and cylinder assembly is at an angle relative to the longitudinal axes of the upper and lower linkage arms, preferably from about 8-40°.

The upper end of the piston and cylinder assembly is advantageously mounted for pivotal movement about an upper axis substantially coincident with the upper pivot axis of the upper linkage arms, and correspondingly the lower end of the piston and cylinder assembly is mounted for pivotal movement about a lower pivot axis substantially coincident with the lower pivot axis of the lower linkage arms. In order to assure the best operation of the coulter assemblies, the supporting structure should be operable to maintain the coulter blade at a depth of at least about 4 inches during traversal of the earth.

BRIEF DESCRIPTION OF THE DRAWINGS

FIG. 1 is a rear perspective view of a coulter assembly in accordance with the invention;

FIG. 2 is a side view of the coulter assembly, shown in use with the coulter blade penetrating the earth;

FIG. 5 is a side view of the coulter assembly in its lowermost position.

DETAILED DESCRIPTION OF THE PREFERRED EMBODIMENT

Figure 3:
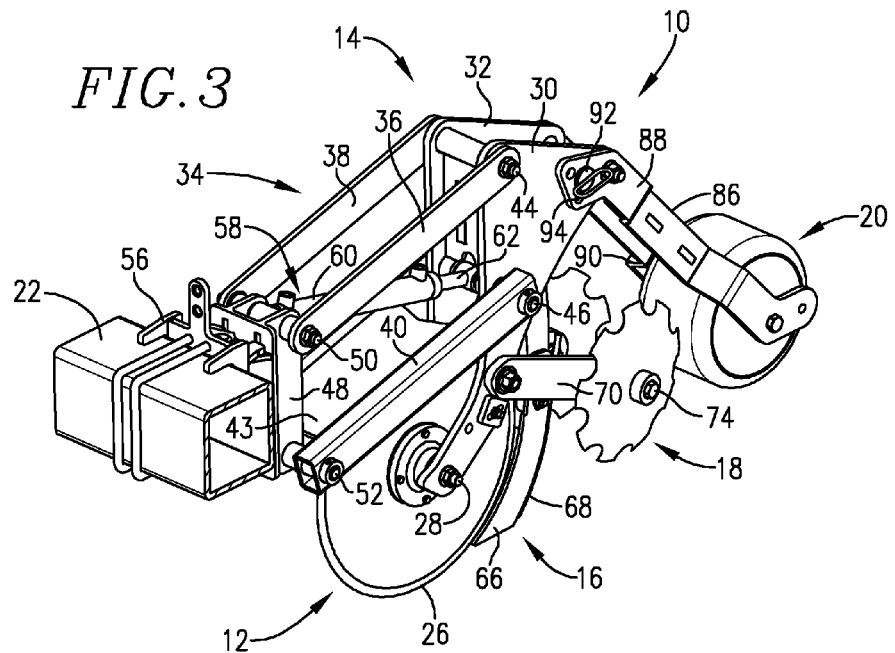
FIG. 3 is a front perspective view of the coulter assembly, illustrated in its uppermost elevated position.

Turning now to the drawings, a coulter blade assembly 10 generally includes an upright, rotatable coulter blade 12, a supporting assembly 14 for the blade 12, a shoe or knife 16 rearward of an din close adjacency to the blade 12, a pair of covering disks 18, and a rearmost gauge wheel 20. The assembly 10 is designed to be secured to a conventional tool bar 22 forming a part of an overall farm implement. In use, a plurality of the coulter assemblies 10 are mounted on tool bar 22 in laterally spaced apart relationship, and as the implement is pulled through a field, the coulter blades 12 and knives 16 penetrate the surface of the earth 24 (FIG. 2) to a desired depth, which is preferably at least about four inches.

In more detail, the blade 12 in the illustrated embodiment is substantially flat and is oriented in an essentially upright fashion. The blade 12 has a sharpened periphery 26 to facilitate formation of a slit or trench in the earth. The blade 12 is mounted for rotation about a trunnion bolt 28.

The supporting assembly 14 includes a pair of laterally spaced apart weldment plates 30 and 32, which support bolt 28 at the lowermost ends thereof. Additionally, a parallel arm linkage assembly 34 forms a part of the assembly 14, and has a pair of laterally spaced upper linkage arms 36, 38 and corresponding lower linkage arms 40, 42; the arms 40, 42 are interconnected by means of a central reinforcing plate 43. The lowermost ends of the linkage arms 36 and 38 are pivotally coupled to the plates 30, 32 by means of a cross bolt 44, whereas the upper ends of the arms 36 and 38 are pivotally mounted to a bracket 48 equipped with a tubular cross shaft receiving a bolt 50. The ends of the lower linkage arms 40, 42 are pivotally mounted to plates 30, 32 and bracket 48 by means of corresponding cross pins 46 and 52. The bracket 48 is supported by an upright pivot tube 54, thereby permitting the assembly 10 to be swung about the vertical axis of the tube 54. Finally, the pivot tube is operatively coupled with a tool bar clamp 56. Thus, the entire assembly 10 is ultimately mounted on tool bar 22.

The overall supporting assembly 14 further has a piston and cylinder assembly 58. In the illustrated embodiment, the upper end of cylinder 60 is pivotally mounted on the upper cross shaft receiving bolt 50, whereas the lower end of piston rod 62 is pivotally secured to the cross pin 46 between the plates 30, 32. As such, it will be observed that the longitudinal axis of assembly 58 is at an angle relative to the longitudinal axes of the upper and lower linkage arms 36-42. This angular relationship changes depending upon the position of assembly 10, but generally the angle ranges from about 8-40°.

The knife 16 has an upper shank 64 secured between the plates 30, 32, and a lower earth-penetrating end 66, which is closely adjacent to the periphery 26 of blade 12. The trailing edge of the knife end 66 is equipped with a delivery tube 68 allowing deposit or injection of seed or fertilizer, e.g., as the assembly 12 traverses the earth.

The covering disks 18 are rotationally mounted on respective legs 70, 72 by bolts 74, 76. The forward ends of the legs 70, 72 are likewise pivotally secured to the plates 30, 32 by 78, 80. A motion-limiting block 82, 84 is affixed to each plate 30, 32, to prevent undue downward movement of the blades 18. It will be observed (FIG. 2) that the blades 18 have a series of circumferentially spaced apart notches, with each notch extending inwardly from the outer periphery of the corresponding blade 18. Further (see FIG. 2), the blades 18 are in relatively close proximity to the coulter blade 12; specifically, the distance between the outer edge 26 of the blade 12 and the maximum, unnotched periphery of the blades 18 is less than the maximum diameter of the blades 18. The peripheral notches on the blades 18 assist in collecting dirt and depositing the dirt to close the slit or trench formed by the coulter blade 12.

The gauge wheel 20 is secured to the plates 30, 32 by means of an oblique arm 86 made up of side members 88, 90. The orientation of wheel 20 may be altered by means of a cross pin 92 extending through the side members 88, 90 and the plates 30, 32. A series of mating pin holes 94 are provided to allow adjustment of the inclination of arm 86 as desired.

During operation of the assembly 10, the gauge wheel 20 is set to a desired inclination, and the piston and cylinder assembly 58 is actuated to press blade 12 into the earth to a desired depth. As the assembly 10 is pulled through a field, the parallel linkage arm assembly 34 and piston and cylinder assembly 58 serve to effectively maintain the blade 12 at the selected depth, even as the assembly traverses uneven areas of the field. As such, straw and other field trash is cut by the blade 12 and does not "hairpin" around the blade 12; this in turn means that the assembly 10 operates with little or no clogging between the blade 12 and knife 16.

Figure 4:
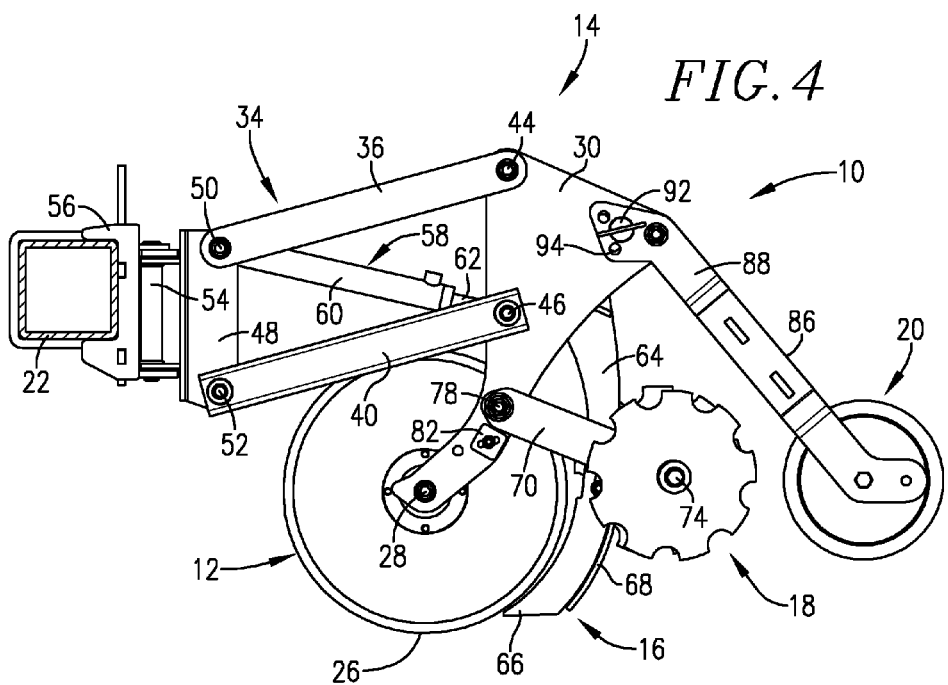
FIG. 4 is a side view of the coulter assembly depicted in FIG. 3.

After field use of the assembly 10, the piston and cylinder assembly 58 is actuated to elevate the assembly 10 above grade, as illustrated in FIGS. 3-4. This allows unrestricted field and road travel of the implement.

I claim:

1. A coulter assembly comprising:
    a coulter blade;
    structure supporting said coulter blade, including a parallel linkage arm assembly comprising upper and lower pivotal linkage arms, and an elongated, obliquely oriented piston and cylinder assembly secured to said supporting structure and operable to maintain the coulter blade at a substantially constant depth as the coulter assembly traverses the earth;
    a knife located adjacent and rearwardly of said coulter blade;
    a covering disk located rearwardly of said coulter blade and knife, said covering disk presenting a periphery with a series of circumferentially spaced apart notches about said periphery, each notch extending inwardly from said periphery; and
    an earth-engaging follower gauge wheel located rearwardly of said covering disk.

2. The assembly of claim 1, said coulter blade being essentially vertically oriented.

3. The assembly of claim 1, said elongated, obliquely oriented piston and cylinder assembly defining a longitudinal axis, said upper and lower pivotal linkage arms also presenting respective longitudinal axes, the longitudinal axis of said elongated, obliquely oriented piston and cylinder assembly being at an angle relative to the longitudinal axes of said upper and lower pivotal linkage arms.

4. The assembly of claim 3, said angle being from about 8-40°.

5. The assembly of claim 1, said linkage arm having an upper end and a lower end, there being an upper pivot pin defining an upper pin pivot axis pivotally supporting the upper end of the upper pivotal linkage arm, and a lower pivot pin defining a lower pin pivot axis pivotally supporting the lower end of said lower pivotal linkage arm, one end of said elongated, obliquely oriented piston and cylinder assembly being pivotally secured to said supporting structure about an axis coincident with the axis of said upper pivot pin, the other end of said elongated, obliquely oriented piston and cylinder assembly being pivotally secured to said support structure about an axis coincident with the axis of said lower pivot pin.

6. The assembly of claim 1, said parallel linkage arm assembly comprising a pair of laterally spaced apart upper linkage arms, and a pair of laterally spaced apart lower linkage arms.

7. The assembly of claim 1, said supporting structure including a clamp operable to be secured to an implement tool bar, and an upright pivot member located between said clamp and said parallel linkage arm assembly.

8. The assembly of claim 1, said coulter blade presenting a pair of opposed faces, there being a pair of laterally spaced apart covering disks respectively located proximal to the opposed faces of said coulter blade.

9. The assembly of claim 1, said supporting structure operable to maintain said coulter blade at a depth of at least 4 inches during said traversal of the earth.

10. The assembly of claim 1, said coulter blade having an outer edge, said covering disk having a maximum, unnotched diameter, said covering disk located so that the periphery of the covering disk is spaced from said coulter blade outer edge a distance which is less than said covering disk maximum diameter.

* * * * *